(12) United States Patent
Senftleben et al.

(10) Patent No.: US 11,859,746 B2
(45) Date of Patent: Jan. 2, 2024

(54) DEVICE FOR CONNECTING TWO TUBULAR OBJECTS

(71) Applicant: NORMA Germany GmbH, Maintal (DE)

(72) Inventors: Stephan Senftleben, Ronneburg (DE); René Schindler, Maintal (DE)

(73) Assignee: Norma Germany GmbH, Maintal (DE)

( * ) Notice: Subject to any disclaimer, the term of this patent is extended or adjusted under 35 U.S.C. 154(b) by 360 days.

(21) Appl. No.: 17/276,180

(22) PCT Filed: Aug. 14, 2019

(86) PCT No.: PCT/EP2019/071852
§ 371 (c)(1),
(2) Date: Mar. 15, 2021

(87) PCT Pub. No.: WO2020/052897
PCT Pub. Date: Mar. 19, 2020

(65) Prior Publication Data
US 2022/0042637 A1    Feb. 10, 2022

(30) Foreign Application Priority Data
Sep. 14, 2018    (DE) .................... 10 2018 122 597.0

(51) Int. Cl.
*F16L 37/248*    (2006.01)
*F16L 37/252*    (2006.01)

(52) U.S. Cl.
CPC .......... *F16L 37/248* (2013.01); *F16L 37/252* (2013.01); *F16L 2201/10* (2013.01)

(58) Field of Classification Search
CPC ... F16L 37/248; F16L 37/107; F16L 37/0885; F16L 2201/10
See application file for complete search history.

(56) References Cited

U.S. PATENT DOCUMENTS 10,480,699 B2    11/2019    Meister et al.
2003/0230125 A1    12/2003    Ritz
(Continued)

FOREIGN PATENT DOCUMENTS

DE    102014106709 B3    12/2014
DE    102015016710 B3    1/2017
(Continued)

OTHER PUBLICATIONS

International Search Report for International Application No. PCT/EP2019/071852 dated Dec. 10, 2019 (3 pages).
(Continued)

*Primary Examiner* — Zachary T Dragicevich
(74) *Attorney, Agent, or Firm* — REISING ETHINGTON, P.C.

(57) ABSTRACT

A device for connecting two tubular objects has a connection piece housing and a sleeve-like element. The connection piece housing having a sleeve portion with an insertion opening and with at least one radially continuous cut-out. The sleeve-like element being complementary to the insertion opening for insertion into the insertion opening. The sleeve portion having at least one first engagement element and the sleeve-like element having at least one second engagement element, which mutually correspond in order to lock the sleeve-like element in the sleeve portion and which can be moved from an open relative position into a locked relative position.

12 Claims, 4 Drawing Sheets

(56) References Cited

U.S. PATENT DOCUMENTS

| | | | |
|---|---|---|---|
| 2008/0279621 A1* | 11/2008 | Chaupin | F16L 37/0885 |
| 2008/0315576 A1* | 12/2008 | Moretti | F16L 37/0885 |
| 2012/0104746 A1* | 5/2012 | Fansler | F16L 37/0885 |
| 2017/0227153 A1* | 8/2017 | Nezu | F16L 37/0885 |
| 2017/0284583 A1 | 10/2017 | Eckard et al. | |
| 2018/0017197 A1 | 1/2018 | Meister et al. | |
| 2020/0056730 A1* | 2/2020 | Kimura | F16L 37/0885 |
| 2020/0191310 A1* | 6/2020 | Kim | F16L 37/0885 |
| 2020/0355308 A1* | 11/2020 | Hunt | F16L 37/088 |

FOREIGN PATENT DOCUMENTS

| | | |
|---|---|---|
| DE | 102017115046 A1 | 1/2018 |
| WO | WO2005047753 A1 | 5/2005 |

OTHER PUBLICATIONS

English Translation of International Search Report for International Application No. PCT/EP2019/071852 dated Dec. 10, 2019 (2 pages).

Japanese Office Action for Japanese Application No. 2021-512645 dated May 10, 2022 (2 pages).

English Translation of Japanese Office Action for Japanese Application No. 2021-512645 dated May 10, 2022 (3 pages).

\* cited by examiner

US 11,859,746 B2

DEVICE FOR CONNECTING TWO TUBULAR OBJECTS

INTRODUCTION

The disclosure relates to a device for connecting two tubular objects.

Such a device permits the connection, in particular, of rigid tubular objects which are produced from a solid material. To this end, the two objects are provided in each case with a component of the device which are plugged together and optionally locked together by a third component.

For checking an optimal connection of the individual components, and thus of the tubular objects, an accurate visual monitoring and the perception of acoustic feedback, which takes the form, for example, of snap-in noises of snap connectors, is expedient. However, this may be costly or awkward in the case of areas which are difficult to access in complex technical systems.

WO 2005/047753 A1 discloses a coupling device for connecting two rigid tubular objects, wherein the device has a bushing part, a plug part and a sleeve-like element which may be attached therebetween. Elastic tongues are provided for snapping the components into one another.

SUMMARY

It is an object per an embodiment of the disclosure to propose a device for connecting two tubular objects in which a connection is possible in a reliable manner and in which the connection may be monitored in a simplified manner.

In an embodiment, a device for connecting two tubular objects which has a connection piece housing and a sleeve-like element is proposed, wherein the connection piece housing has a sleeve portion with an insertion opening and with at least one radially continuous cut-out, wherein the sleeve-like element is complementary to the insertion opening for insertion into said insertion opening, and wherein the sleeve portion has at least one first engagement element and said sleeve-like element has at least one second engagement element, which mutually correspond in order to lock the sleeve-like element in the sleeve portion and which can be moved from an open relative position into a locked relative position. For solving the aforementioned object, per an embodiment, the sleeve-like element has a display element that: extends radially outwards from the sleeve-like element; in the open relative position projects through the at least one cut-out; and in the locked relative position is moved radially inwardly and is completely covered by a component disposed in the cut-out.

The device is able to connect together two tubular objects in a reliable manner. To this end, one of the tubular objects is connected to the connection piece housing on a side which is remote from the insertion opening. The other tubular object may have a plug part which is inserted into the sleeve-like element and is encompassed by the sleeve-like element. The sleeve-like element may be plugged with the encompassed plug part into the insertion opening in order to be able to permit the at least one first engagement element and the at least one second engagement element to be engaged in one another or with one another therein.

The particularity of the device according to an embodiment of the disclosure is that a display element is provided, said display element being arranged on the sleeve-like element. This sleeve-like element may be radially moved such that at least two discrete states may be adopted. In the open relative position, i.e. when the first and the second engagement elements do not engage or do not fully engage in one another, the display element projects radially outwardly from the cut-out of the connection piece housing so that the display element is clearly visible to a user. In the locked relative position, however, the display element is moved radially inwardly by a component in the connection piece housing, such that said display element is completely covered and not visible to the user. As a result, the user obtains directly and in a direct manner a visual display as to whether the first and second engagement elements engage fully in one another and/or whether they are located in the locked relative position. To this end, the display element should be designed as far as possible to be spring-elastic or to have at least one spring-elastic foot which tolerates a radially inwardly oriented movement.

For the device according to an embodiment of the disclosure it is primarily unimportant how the engagement elements are configured in detail and whether a plurality of different engagement elements may be used. The engagement elements may require both a rotational and a translational relative movement of the connection piece housing and the sleeve-like element to one another. A feature per an embodiment is in the radial mobility of the display element which is moved by the action of the first engagement element from a position which is visible to a user into a position which is concealed and not visible. The continuous cut-out may be implemented in this case as a recess in an envelope surface of the connection piece housing.

The component which moves the display element radially inwardly may be, for example, a projection running in the peripheral direction. To this end, the display element or a body connected thereto may have a beveled surface which is supported on the projection and, when the sleeve-like element is twisted, causes a radial movement of the display element or the body connected thereto. The beveled surface may be beveled in the radial direction or in the peripheral direction. Preferably, per an embodiment, in this case the projection projects in the peripheral direction into the cut-out of the connection piece housing. The display element could then be located in front of or to the rear of the projection relative to the insertion opening. By a rotation of the sleeve-like element relative to the connection piece housing, the projection and the display element may be displaced relative to one another. Based on the design of the projection and/or the display element, with a continued rotation a radially inwardly acting force may be exerted on the display element so that as a result thereof the display element is moved radially inwardly. In this case, the projection may have a dimension which varies in the peripheral direction, for example, wherein the display element is supported on the projection and when rotated into the locked position the display element is forced radially inwardly due to the variable dimension.

Alternatively, the component may also be a ramp body which is fixedly arranged in the connection piece housing and which has an, in particular per an embodiment, beveled ramp surface which when the sleeve-like element is twisted leads to a radial movement of the display element. To this end, the display element or a body connected to the display element may be brought into a surface contact with the ramp surface and, when twisted, may be correspondingly moved in a radial direction.

The connection piece housing may have outer ramp surfaces on an outer periphery, said outer ramp surfaces widening radially outwardly in the peripheral direction, wherein the sleeve-like element has tabs which extend in the axial direction of the sleeve-like element and wherein the tabs and the outer ramp surfaces are configured so as to correspond to one another such that, by rotating the sleeve-like element in the connection piece housing into the locked position, the tabs slide onto the outer ramp surfaces. As a result, the tabs are positioned such that they are preferably located directly radially outside an outer periphery of the connection piece housing, per an embodiment. The sleeve-like element may be inserted into the insertion opening, wherein in this case the tabs are located on the outer periphery of the connection piece housing. Preferably, per an embodiment, the sleeve-like element is placed on the connection piece housing such that the engagement elements are located in an open position. By rotating the two components relative to one another, the tabs slide onto the outer ramp surfaces and are successively radially widened as a result. The outer ramp surfaces may be regarded as first engagement elements and the tabs as second engagement elements.

In an embodiment the tabs are configured to be radially resilient. The pushing of the tabs onto the ramp surfaces leads to a bracing of the tabs on the outer ramp surfaces so that a non-positive locking is implemented thereby.

Alternatively or additionally, the outer ramp surfaces may also be configured to be radially resilient.

The tabs may also have a pretensioning and in the peripheral direction a radial cut-out could be provided directly on a radially innermost region of an outer ramp surface. Due to the pretensioning of the tabs, a slight clamping force is exerted by the tabs onto an envelope surface of the connection piece housing. For premounting the device according to an embodiment of the disclosure, the tabs may be inserted in each case into a radial cut-out so that the sleeve-like element is secured therein in the open position.

The tabs may additionally have on their inwardly oriented peripheral surfaces latching elements which are able to be brought into engagement with correspondingly shaped latching elements on the outer ramp surfaces. A toothed structure or an arrangement of rollers could be provided. In the locked position a positive connection may also be achieved thereby.

The outer ramp surfaces could also be dimensioned such that, when the locked position is reached, the tabs have passed completely through the outer ramp surfaces and snap onto the outer periphery of the connection piece housing in the peripheral direction behind the outer ramp surfaces. As a result, an effective locking may be achieved, said locking being able to be released again only by prizing up the tabs so as to be pushed onto the outer ramp surfaces.

Preferably, per an embodiment, at least one region of an outer envelope surface of the sleeve-like element has a geometry which corresponds to a geometry in an internal envelope surface of the connection piece housing, such that the sleeve-like element is able to be inserted into the insertion opening only in a specific orientation relative to the connection piece housing. The correct orientation of the sleeve-like element is ensured thereby and an assembly error practically eliminated.

The connection piece housing could have an indexing cut-out which is able to be brought into engagement with the sleeve-like element or a connection piece inserted into the connection piece housing.

Moreover, the at least one first engagement element could be produced in the radial cut-out in the connection piece housing, wherein the at least one second engagement element may be a latching element which snaps onto an edge of the radial cut-out when the sleeve-like element is inserted.

In particular in the case of a continuous radial cut-out which may also be designed as an undercut in the insertion opening, a twisting of the sleeve-like element in the connection piece housing is permitted. The latching element may be designed to be spring-elastic so that when inserted into the connection piece housing it is able to slide over the corresponding edge of the cut-out, by being increasingly deformed until a snap-in process is carried out by springing back into the original shape.

For the improved introduction of torque into the sleeve-like element, per an embodiment, said sleeve-like element may have an outer peripheral surface which is provided with a handling profile. The handling profile may have, for example, a plurality of straight edges which adjoin one another and which are at predetermined angles to one another. A correspondingly shaped tool may be brought into engagement with the handling profile.

Moreover, the display element could be a tab which is arranged on an elastic foot. The tab could have a marking or a visually noticeable coloration which may be easily identified by a user. The tab is geometrically simple and may optimize the production process.

Preferably, per an embodiment, a ramp body is arranged in the radially continuous cut-out, said ramp body having a radially beveled ramp surface which may produce a surface contact with a radially internal surface of the second engagement element. As a result, the ramp body is the aforementioned component in the cut-out which is able to move the display element radially inwardly. The ramp body could be arranged approximately adjacent to a projection and act on the second engagement element. By a movement of the second engagement element radially outwardly, an elastic foot located between the second engagement element and the display element may be held in its radial position by the projection so that the foot bends elastically, such that when the second engagement element is moved outwardly the display element arranged on the other side of the foot is moved radially inwardly.

BRIEF DESCRIPTION OF THE FIGURES

Further features, details and advantages of the disclosure are disclosed in the wording of the claims and in the following description of exemplary embodiments with reference to the drawings, in which:

DETAILED DESCRIPTION

Figure 1:
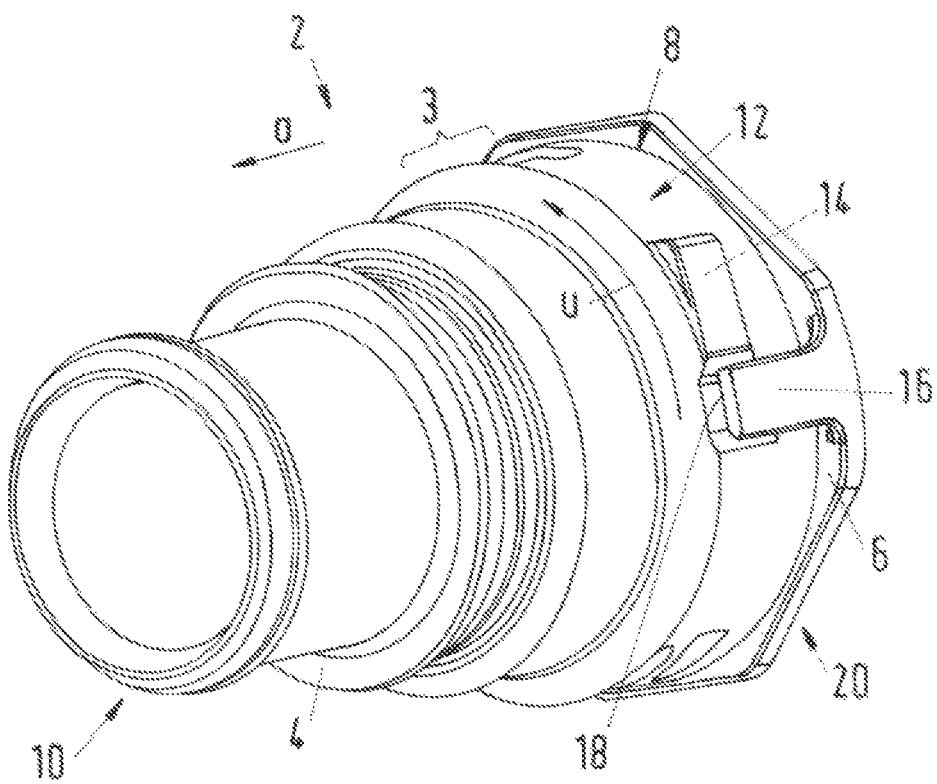
FIG. 1 shows a perspective view of a device according to an embodiment of the disclosure.

FIG. 1 shows a three-dimensional view of an embodiment of a device 2 according to the disclosure for connecting two tubular objects. The device 2 has a connection piece housing 4 with a sleeve portion 3 and a sleeve-like element 6 which is inserted into an insertion opening 8 of the connection piece housing 4. A connecting end 10 of the connection piece housing 4 may be coupled to one of the objects (not shown) to be connected.

The connection piece housing 4 has on an outer periphery, i.e. on an outer envelope surface 12, outer ramp surfaces 14 widening radially outwardly in the peripheral direction u. The outer ramp surfaces 14 have a substantially rectangular bottom surface. The sleeve-like element 6 has tabs 16 which extend in the axial direction a of the sleeve-like element 6. The tabs 16 are arranged such that, when the sleeve-like element 6 is twisted, the tabs slide from a radial cut-out 18 onto the outer ramp surfaces 14. Due to a spring-elastic design the tabs 16 are radially widened and are jammed at the same time onto the outer ramp surfaces 14.

For the preassembly, the tabs 16 may be configured with a certain degree of pretensioning so that they exert a slight clamping force onto the cut-outs 18 and as a result are secured thereto. The radial cut-outs 18 could also have a defining edge (not shown) which is oriented toward the insertion opening 8 and prevents the tabs 16 from slipping out. An open position of the device 2 according to an embodiment of the disclosure is shown here.

The sleeve-like element also has a handling profile 20 which has a plurality of straight edges 22 adjoining one another. These edges are at a predetermined angle to one another and permit the engagement of a tool (not shown) so that it is also possible to introduce a greater torque onto the sleeve-like element 6.

Figure 2:
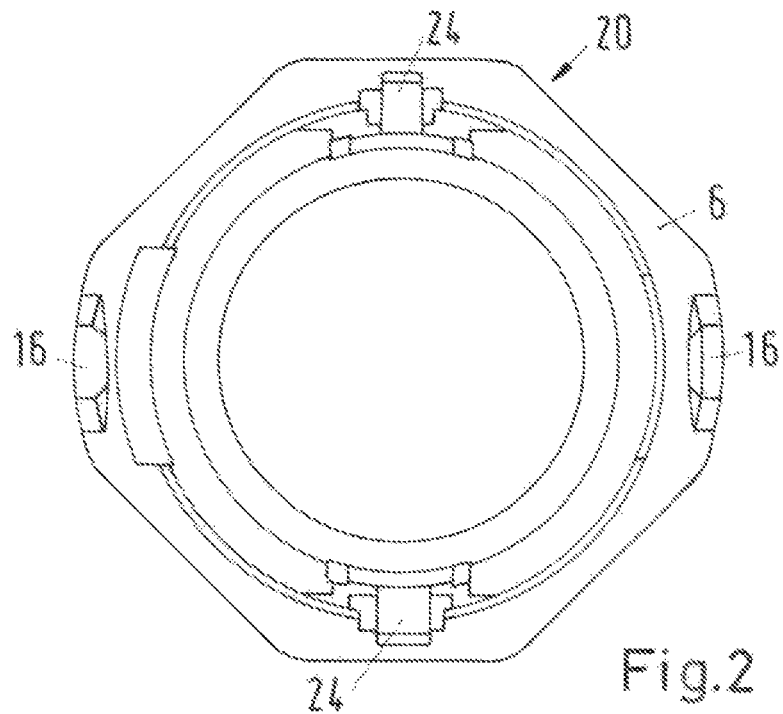
FIG. 2 shows a plan view of a sleeve-like element.

The sleeve-like element 6 is shown in FIG. 2 in a plan view of a side facing toward the insertion opening 8 in the assembled state. The positions of the tabs 16 at the radially external positions may be identified here. Additionally, tab-shaped display elements 24 are shown at two installed positions which oppose one another, the mode of operation thereof being explained with reference to the following figures. By way of example, a connecting axis between the display elements 24 is perpendicular to a connecting axis between the tabs 16. These components serve for indicating a successful locking between the sleeve-like element 6 and the connection piece housing 4. As a result, a display element 24 is arranged offset by 90° to a tab 16 and vice versa.

Figure 3:
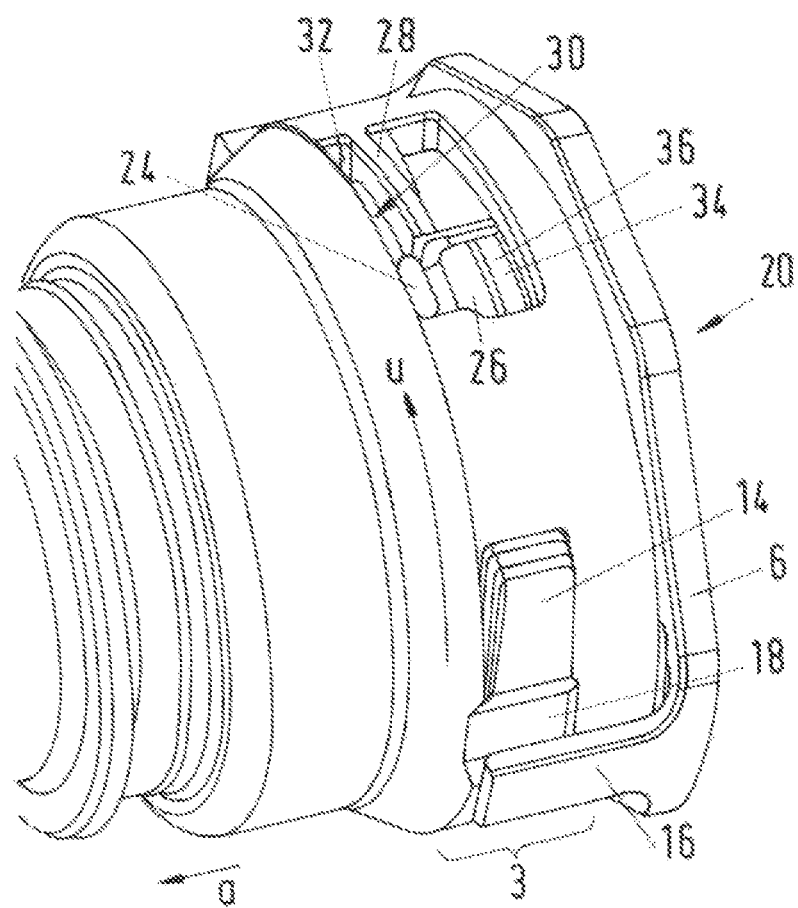
FIG. 3 shows the view of FIG. 1 from a slightly different perspective.

FIG. 3 shows a slightly different perspective of the device 2 in which a display element 24 is visible. This display element is located in a continuous radial cut-out 26 of the connection piece housing 4 in which a projection 28 extending in the peripheral direction u is located. The projection 28 encloses with an edge 30 remote from the insertion opening 8 a slot 32 into which the display element 24 may be pushed when the sleeve-like element 6 is rotated. The display element 24 and the projection 28 are designed such that when the display element 24 is displaced into the slot 32 as far as a specific position, the display element 24 is moved radially inwardly and is no longer visible to the user. This is shown in further detail in FIGS. 5, 6 and 7.

A first engagement element 34 is produced on the sleeve portion 3 of the connection piece housing 4 by an edge of the radial cut-out 18 facing the insertion opening 8. The sleeve-like element 6 has a corresponding second engagement element 36 which is produced in the form of a resilient latching element which is brought into engagement with the edge.

Figure 4:
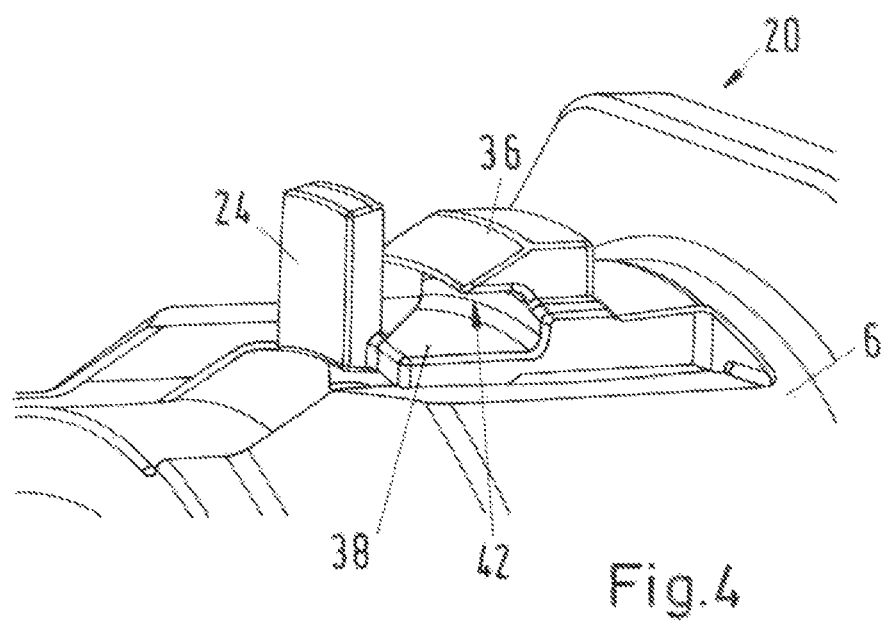
FIG. 4 shows a perspective view of a detail of the sleeve-like element.

FIG. 4 shows a detail of the sleeve-like element 6 with a tab-shaped display element 24 which extends radially outwardly from a foot 38. The foot 38 may be designed to be resilient so that by a radially inwardly oriented force an elastic deformation of the foot 38 can be achieved, the display element 24 also being moved radially inwardly thereby. The second latching element 36 has by way of example a wedge shape by which the second latching element 36, when the sleeve-like element 6 is inserted into the insertion opening 8, may be deflected radially inwardly in order to be subsequently latched to the first engagement element 34.

Figure 5:
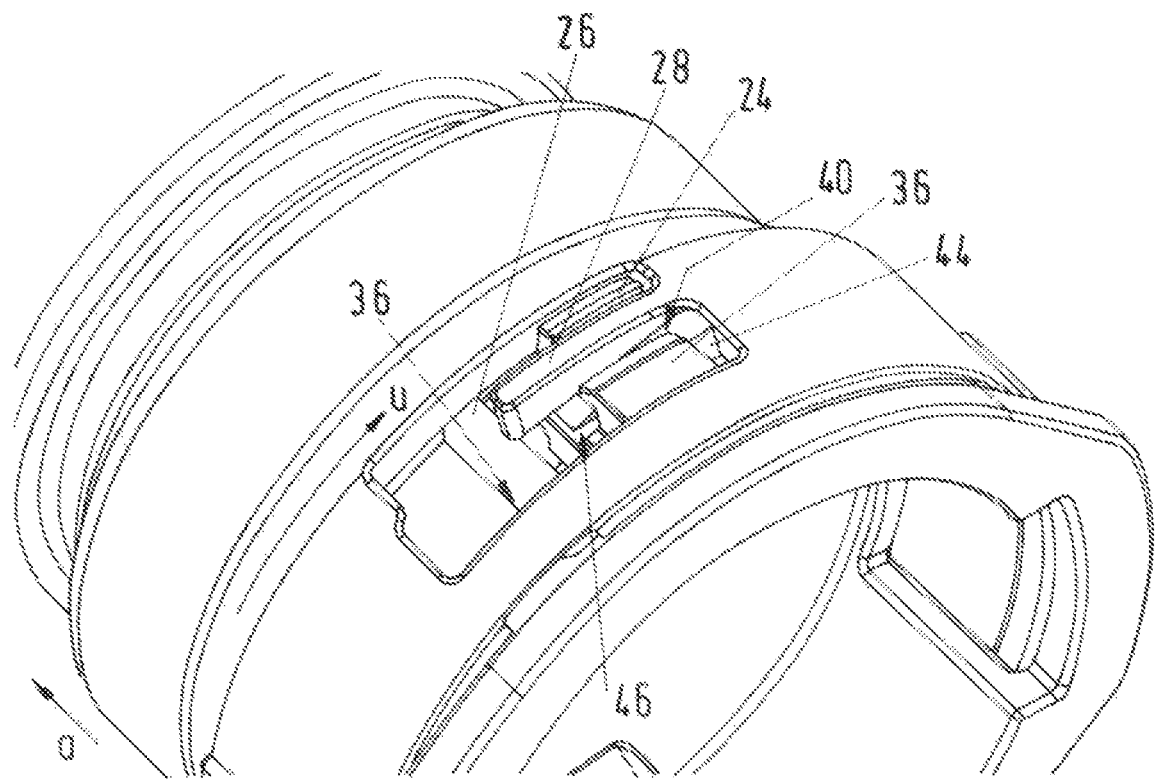
FIG. 5 shows the view of FIG. 3 from a further perspective.
Figure 6:
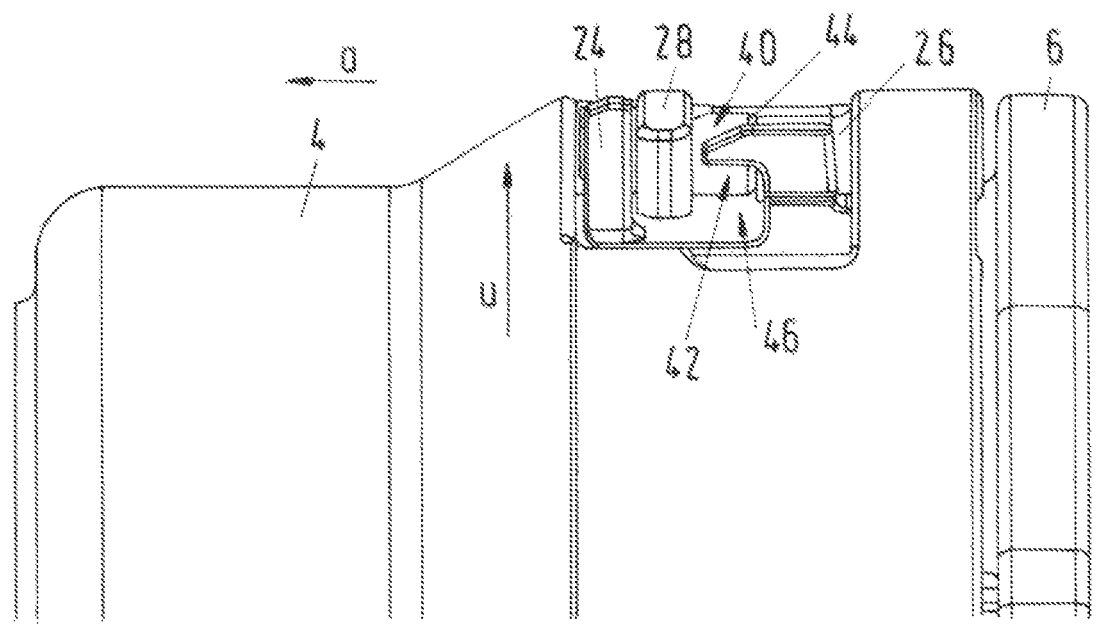
FIG. 6 shows a side view of the view of FIG. 5.
Figure 7:
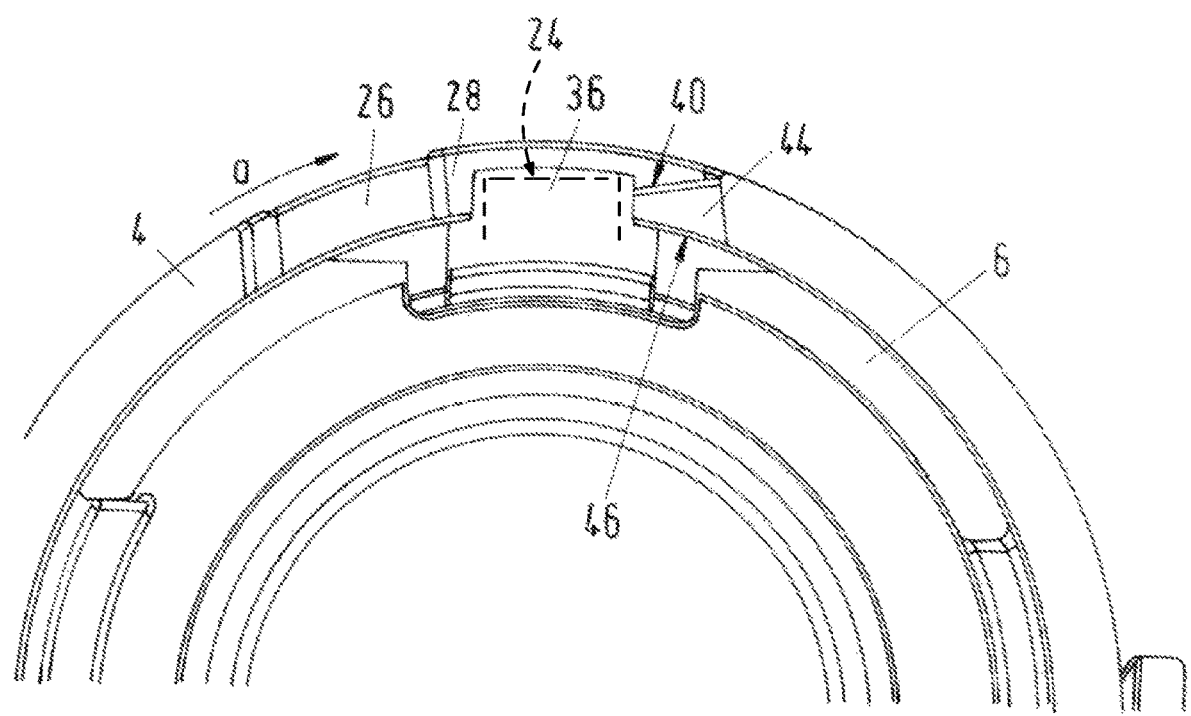
FIG. 7 shows a detail of a front view of the view of FIG. 5.

FIGS. 5, 6 and 7 show a ramp surface 40 in the radial cut-out 26 which in some regions extends radially outwardly along the projection 28 in the peripheral direction u. The ramp surface 40 is arranged on a side of the projection 28 remote from the slot 32. When the sleeve-like element 6 is inserted into the connection piece housing 4, the second engagement element 36 is located with a radially internal surface 42 on the ramp surface 40. By rotating the sleeve-like element 6 in the peripheral direction u the display element 24 runs along the slot 32 on the projection 28 and onto the ramp surface 40. When the radially internal surface 42 of the second engagement element 36 reaches the ramp surface 40, it is urged radially outwardly. The foot 38 of the display element 24, however, is in a surface contact with a radially internal surface of the projection 28 and as a result may not be moved radially outwardly. When the radially internal surface 42 is deflected and when the movement of the foot 38 is limited at the same time, the foot is bent such that the display element 24 connected thereto is pulled radially inwardly.

The ramp surface 40 may be implemented on a ramp body 44 which on a side opposing the ramp surface 40 has an internal ramp body surface 46 which has a uniform radius and as a result has no radial extent. The ramp body 44 may be an integral component of the connection piece housing 4. Alternatively, the ramp body 44 may also be bonded or welded to the projection 28.

Figure 8:
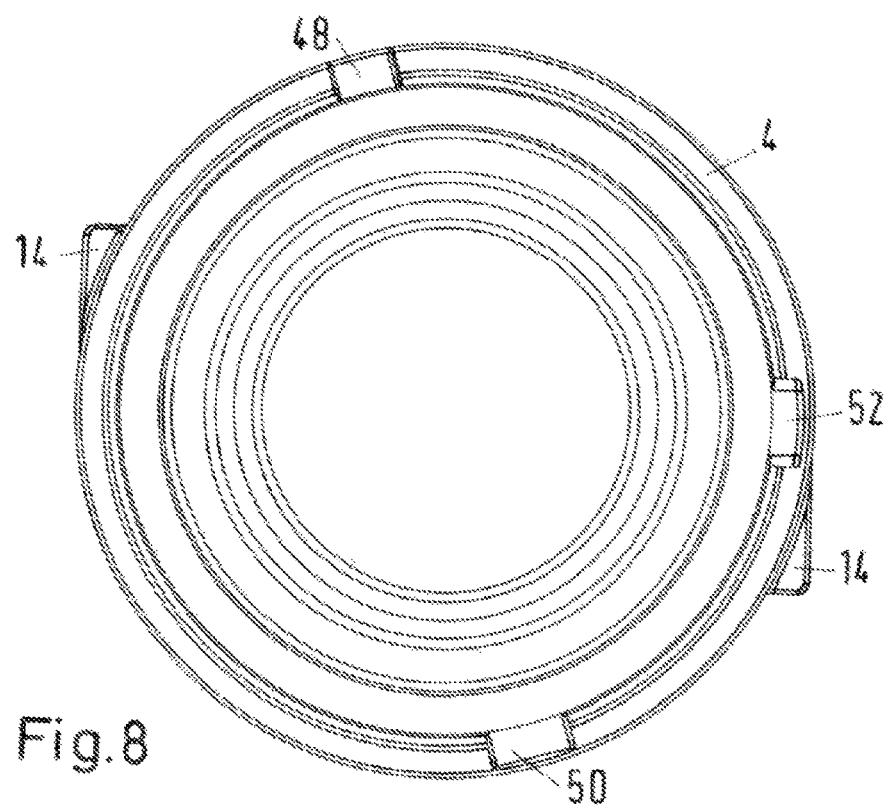
FIG. 8 shows a plan view of an insertion opening of the connection piece housing.

FIG. 8 also shows a plan view of an insertion opening of the connection piece housing 4. In this case, two recesses 48 and 50 opposing one another in the peripheral direction are shown, said recesses being shaped and arranged so as to correspond to the display elements 24 shown in FIG. 2. The two display elements 24 have different widths which correspond to the widths of the recesses 48 and 50. As a result, the sleeve-like element 6 may be inserted only in a single predetermined position into the connection piece housing 6 when the display elements 24 and the recesses 48 and 50 correspond with one another.

A cut-out 52 which is arranged between the recesses 48 and 50 and which is arranged on an internal face of the connection piece housing 4 is also shown. An element which functions as an anti-twist device may be received herein.

The invention is not limited to one of the above-described embodiments but is able to be modified in many different ways.

All of the features and advantages disclosed in the claims, the description and the drawings, including structural details, spatial arrangements and method steps may be essential to the invention both per se and in the various combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE DESIGNATIONS

2 Device for connecting two tubular objects
3 Sleeve portion
4 Connection piece housing
6 Sleeve-like element
8 Insertion opening
10 Connecting end
12 Outer envelope surface of connection piece housing
14 Outer ramp surface
16 Tab
18 Radial cut-out
20 Handling profile
22 Edge
24 Display element
26 Radially continuous cut-out
28 Projection
30 Edge
32 Slot
34 First engagement element
36 Second engagement element
38 Foot
40 Ramp surface
42 Radially internal surface
44 Ramp body
46 Internal ramp body surface
48 Recess
50 Recess
52 Cut-out
a Axial direction
u Peripheral direction

The invention claimed is:

1. A device for connecting two tubular objects, the device having a connection piece housing and a sleeve element,
wherein the connection piece housing has a sleeve portion with an insertion opening and with at least one radially continuous cut-out, wherein the sleeve element is complementary to the insertion opening for insertion into the insertion opening,
wherein the sleeve portion has at least one first engagement element and the sleeve element has at least one second engagement element, which mutually correspond in order to lock the sleeve element in the sleeve portion and which can be moved from an open relative position into a locked relative position,
wherein the sleeve element has a display element that: extends radially outwards from the sleeve element; in the open relative position projects through the at least one radial cut-out; and in the locked relative position is moved radially inwardly and is completely covered by a component disposed in the at least one radial cut-out.

2. The device as claimed in claim 1, wherein the component is a projection that projects in the peripheral direction into the at least one radial cut-out of the connection piece housing.

3. The device as claimed in claim 1, wherein the connection piece housing has outer ramp surfaces on an outer periphery, the outer ramp surfaces widening radially outwardly in the peripheral direction (u),
wherein the sleeve element has tabs which extend in the axial direction (a) of the sleeve element and wherein the tabs and the outer ramp surfaces are configured so as to correspond to one another such that, by rotating the sleeve element in the connection piece housing into the locked position, the tabs slide onto the outer ramp surfaces.

4. The device as claimed in claim 3, wherein the tabs are configured to be radially resilient.

5. The device as claimed in claim 3, wherein the outer ramp surfaces are configured to be radially resilient.

6. The device as claimed in claim 3, wherein the tabs have a pretensioning and in the peripheral direction (u) a radial cut-out is provided directly on a radially innermost region of an outer ramp surface.

7. The device as claimed in claim 1, wherein at least one region of an outer envelope surface of the sleeve element has a geometry which corresponds to a geometry in an internal envelope surface of the connection piece housing, such that the sleeve element is able to be inserted into the insertion opening only in a specific orientation relative to the connection piece housing.

8. The device as claimed in claim 1, wherein the connection piece housing has a cut-out which is able to be brought into engagement either with the sleeve element or a connection piece inserted into the connection piece housing.

9. The device as claimed in claim 1, wherein the at least one first engagement element is produced in the at least one radial cut-out in the connection piece housing,
wherein the at least one second engagement element is a latching element which snaps onto an edge of the at least one radial cut-out when the sleeve element is inserted.

10. The device as claimed in claim 1, wherein the sleeve element has an outer peripheral surface which is provided with a handling profile.

11. The device as claimed in claim 1, wherein the display element is a tab which is arranged on an elastic foot.

12. The device as claimed in claim 1, wherein a ramp body is arranged in the at least one radial cut-out, the ramp body having a radially beveled ramp surface which may produce a surface contact with a radially internal surface of the at least one second engagement element.

* * * * *